United States Patent Office 2,929,690
Patented Mar. 22, 1960

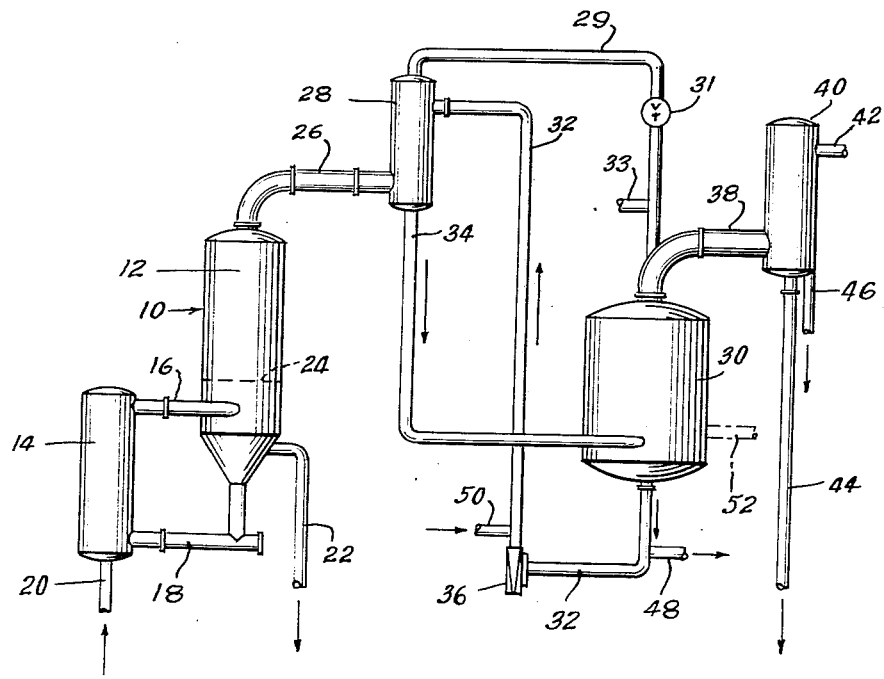

2,929,690

APPARATUS FOR REMOVING IMPURITIES FROM VAPORS RELEASED IN EVAPORATION PROCESS

Richard C. Bennett, Park Forest, and William G. Dedert, Crete, Ill., assignors to Whiting Corporation, a corporation of Illinois Application April 27, 1956, Serial No. 581,183

5 Claims. (Cl. 23—263)

Our invention relates to a method and apparatus for recovering impurities vaporized during evaporation processes and is particularly applicable to processes employed in treating raw phosphoric acid liquors.

Phosphate ore is conventionally treated with an aqueous acidic solution to convert the phosphate values into soluble acidic form. The resulting solution is not only relatively dilute but also contains several compounds other than phosphates which constitute impurities. The dilute and impure phosphate liquor is subjected to evaporation to increase the concentration of phosphoric acid and to reduce the impurities present. These impurities include various compounds of fluorine which vaporize during the evaporation step mentioned and are discharged from the evaporator together with the water vapor. Ordinarily these fluorine compounds are condensed with the water vapor and are discharged from the condensing system of the evaporator as waste. This represents not only a loss of a potentially valuable material but also contaminates the discharge to such a degree as to frequently render it objectionable.

One of the principal objects of our invention is therefore the provision of a method and apparatus for recovering in useable form and concentration compounds other than water vaporized during an evaporation operation, thereby preventing contamination of the condenser discharge and cooling water.

More specifically, the objects of this invention include provision of a method and apparatus utilizing a continually recirculated stream of liquid for condensing and collecting fluorine compounds and similar vapors evolved during evaporation of phosphoric acid liquors as well as the provision of means for removing condensed water vapor from the recirculated stream and the collection of the concentrated non-aqueous materials from the stream in commercially useable concentrations.

A further object of this invention is the provision of a method and apparatus for converting soluble fluorine compounds collected by condensation in a circulating stream of liquid into solid form for subsequent separation and recovery.

Other objects of our invention, including the provision of a continuously operating, relatively inexpensive and high efficient apparatus for the purposes stated, will become apparent from the following detailed description and from the appended drawing in which:

The single figure is a diagrammatic representation of an apparatus suitable for use in practicing our invention.

The subject invention is illustrated as applied to the recovery of fluorine compounds vaporized during the evaporation of acidic aqueous phosphoric acid liquor. However, it should be understood that the same principals may be applied to other compounds and liquors.

In brief, the vapors generated in the evaporator body of the process described consist principally of water vapor but include small quantities of fluorine compounds. These vapors are completely condensed, preferably by direct contact with a continuously circulating stream of liquid, as for example in a contact condenser. The liquid containing the condensed materials is then passed through a flash tank or its equivalent where it is cooled by evaporation to a suitable temperature and a substantial proportion of the condensed water vapor removed as vapor for subsequent condensation in a second condenser and discharged from the system. The cooled liquid is then recirculated to the first mentioned condenser. The concentration of the compounds such as fluorine in the circulating stream of liquid will therefore increase and can be removed at a rate necessary to maintain the desired degree of concentration, water being introduced as necessary to maintain equilibrium.

In one form of our process a reagent is introduced into the circulating stream for reaction with the fluorine or other compounds to yield an insoluble precipitate which may be separated by filtration, settling or other desired process.

From the foregoing brief description it will be apparent that the fluorine or other compounds are never transferred to water discharged as waste from the system, but on the contrary are raised to a desired degree of concentration and removed from the system for sale or further treatment.

The drawing illustrates in somewhat greater detail the equipment employed in the treatment briefly described. An evaporator, generally designated 10, includes a body 12 having a conical bottom communicating with a heater feed conduit 18. A heater 14, such as a conventional heat exchanger, receives liquor from the conduit 18, increases the temperature to the desired degree and discharges the heated liquor back into the body 12 through a conduit 16. This latter conduit preferably communicates with the body 12 below the level of liquor therein, indicated by the dotted line 24. Raw phosphoric acid solution containing dissolved fluoride compounds such as $SiF_4$ and HF is fed to the system through an inlet conduit 20 communicating with liquor passages disposed within the heat exchanger 14. Subatmospheric pressure is maintained in the body 12 above the liquor and regulated to maintain the desired evaporating conditions. Concentrated and purified phosphate solutions may be withdrawn through a conduit 22.

Obviously, the operator of the process may select the various operating conditions desired within the capacity of the equipment. By way of illustration however, the raw phosphoric acid liquor fed to the system through conduit 20 may contain approximately 32% $P_2O_5$ and may be discharged through the conduit 22 with a concentration of perhaps 54% of $P_2O_5$. The quantity of heat added to the liquor by the heat exchanger 14 may be sufficient to maintain an operating temperature within the body of approximately 198° F. and the pressure therein may be approximately 2.4 inches of mercury absolute. The vapors evolved through evaporation will be saturated at a temperature of approximately 108° F. and will include $SiF_4$ and HF as well as $H_2O$ and a small portion of noncondensible vapors such as air. Under the approximate conditions stated substantially all of the $SiF_4$ and HF will be discharged from the phosphoric acid liquor which may be circulated through the heater by thermal effects or a pump as desired.

The vapors generated within the body 12 are led through a conduit 26 to a condenser 28 which is preferably of the direct contact type. The vapors are thus brought into direct contact with a stream of liquid passing downwardly through the condenser 28 and since the liquid is maintained at a sufficiently low temperature, the vapors will be condensed and mingled with this stream of liquid. The liquid stream, containing the condensed vapors, is passed through conduit 34 to a flash tank 30 maintained under subatmosphreic pressure and cooled therein by evaporation. The temperature and pressure conditions maintained within this body, however, are such that $SiF_4$ and $HF$ vapors or other fluorine compounds are not evolved. The cooled liquid is then recirculated by pump 36 through conduit 32 back to the condenser 28. The vapors evolved in the flash tank 30 are led through conduit 38 to a condenser 40 of conventional design. Cooled water may, if desired, be introduced through conduit 42 and discharged by conduit 44 while the condensate may be segregated and discharged through conduit 46. If desired, the condensate may be mixed with the cooling water feed and circulated in conventional manner. Pipe 29 connects the condenser 28 and the flash tank 30 through a throttling valve 31, the latter being utilized to regulate the absolute pressure maintained in the condenser 28 and flash tank 30.

From the foregoing it is apparent that the temperature of the circulating stream of liquid flowing through the conduits 32 and 34 and the flash tank 30 and condenser 28 must be maintained at a temperature sufficiently low to condense the vapors generated by the evaporator 10. By way of example, liquor leaving the flash tank 30 may be maintained at a temperature of 96° F. The discharge temperature of this liquor after passing through the condenser 28 may for example reach 104° F., this temperature being reduced to the desired 96° F. by evaporating a sufficient quantity of water in the flash tank 30. This could be accomplished by maintaining a pressure within the flash tank of approximately 1.4 inches of mercury absolute. Under such conditions water vapor formed in the flash tank 30 will be saturated at approximately 91° F. and the temperature of the liquid will be reduced to approximately 96° F.

As the liquid is circulated in its closed circuit through the flash tank 30 and condenser 28, it will be seen that the concentration of fluoride or other compounds will gradually increase, this being true since these compounds are not vaporized in the flash tank 30. Preferably this concentration is permitted to increase until a desired level is reached after which a quantity of the circulating liquid can be continuously withdrawn through a suitable conduit 48 at a rate which maintains the desired level of concentration. Water or reagents may be introduced into the circulating liquid stream through a suitable conduit in such quantity as required to maintain the desired equilibrium of the circulating liquid. Alternatively, reagents may be introduced directly into the flash tank through conduit 52.

It is of course, necessary that the absolute pressure in the flash tank 30 be less than the absolute pressure in the evaporator body 12 and that noncondensable materials such as air be eliminated from the system. The throttling valve 31 is employed to regulate the difference in the absolute pressure between the body 12 and the flash tank 30. The pipe 29, in which the valve 31 is located, conducts noncondensible gases from the condenser 28 and body 12 through the system to a point where they can be eliminated by a conventional means such as an ejector or a pump. Conventional devices may be employed for this purpose and may be connected in any one of several locations, as for example conduit 33 communicating with conduit 29.

In operation it will be noted that the concentration of nonaqueous materials in the liquor treated in the evaporator 10 is quite high and that the temperature of the liquor in the evaporator 10 is considerably above the temperature of the evolved vapors at saturation. This boiling point rise and the high concentration of nonaqueous materials both favor the evolution of $SiF_4$ and $HF$. In the flash tank 30 however, the conditions are reversed. The temperature of the circulating liquid in the tank 30 is relatively low, as is the concentration of nonaqueous material, and the temperature of the evaporating liquid is quite close to the temperature of the vapors at saturation. This reversal of conditions inhibits the evolution of fluoride vapors. Should the concentration of nonaqueous materials such as fluoride compounds be permitted to increase excessively, some vaporization of these compounds could occur. This may be avoided by holding the percentage concentration by weight of fluorine compounds in the circulating liquid below 30 and preferably at about 15.

As the fluorine compounds condense in the circulating liquid, the $SiF_4$ and $HF$ apparently hydrolyze to yield $H_2SiF_6$ and $SiO_2$. These reactions are:

$$3SiF_4 + 2H_2O \rightarrow 2H_2SiF_6 + SiO_2$$
$$4HF + SiO_2 \rightarrow SiF_4 + 2H_2O$$

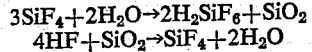

The $SiO_2$ forms a solid which circulates with the liquid and is removed from the system with the $H_2SiF_6$ or may be separated within the system by conventional devices.

The addition of $KOH$ to $H_2SiF_6$ produces $K_2SiF_6$, this latter compound having a very limited solubility and therefore appearing as a solid precipitate. This may be discharged with a quantity of the liquid through conduit 48 as described for subsequent separation or other treatment.

The quantity of water evaporated in the flash tank 30 will be slightly less than the quantity of water condensed by the condenser 28. However, through the discharge of either solids or solutions through conduit 48, the system will under most circumstances undergo a net loss, making necessary the introduction of make-up water through conduit 50. Condensate from conduit 46 may be employed for this purpose.

It should be particularly noted that the cooling water discharged from conduit 44 and condensate discharged through conduit 46 are not contaminated with fluorine compounds or other impurities and may therefore be safely employed for other purposes. The system collects fluorine or other similar compounds as a by-product and is capable of increasing the concentration of these compounds to a practical degree. The system operates continuously in an efficient manner and requires only a minimum number of moving parts, primarily the circulating pump 36.

We claim:

1. Apparatus for recovering vaporizable fluorine compounds from raw relatively weak phosphoric acid liquor comprising an evaporator having an inlet for said liquor and having in its upper portion an outlet conduit for fluorine compound vapors and water vapor vaporized from said liquor and having in its lower portion an outlet for delivering relatively strong phosphoric acid liquor relatively free of fluorine compounds, a direct contact condenser having a vapor inlet in its lower portion communicating with the vapor outlet conduit of the evaporator for receiving said vapors therefrom, a flash tank, conduit means forming a closed circuit including said direct contact condenser and flash tank, a pump for continuously recirculating a stream of water through said closed circuit, fluid removal means for maintaining a sub-atmospheric pressure in said flash tank while the direct contact condenser establishes heat transfer relation between the water and the vapors entering through said vapor inlet and while fluorine compound vapors condense in the water flowing in the closed circuit, an outlet in the upper portion of the flash tank for discharging vapors not condensed therein, means for continuously removing from the closed circuit including the direct contact condenser and flash tank a portion of the water containing said fluorine compounds in solution, and liquid inlet means for replenishing the water in said closed circuit.

2. The combination claimed in claim 1, including a condenser connected to the outlet in the upper portion of the flash tank for condensing vapors evolved in the flash tank and maintaining sub-atmospheric pressure therein.

3. The combination claimed in claim 1, including a condenser connected to the outlet in the upper poriton of the flash tank for condensing vapors evolved in the flash tank and a conduit for supplying condensate from said condenser to the cooling water in said condenser.

4. The combination claimed in claim 1, including a throttling valve in that portion of the closed circuit-forming conduit means leading from the direct condenser to the flash tank, said valve being adapted to be regulated to maintain a lower pressure in the flash tank than in the direct condenser.

5. The combination claimed in claim 1, including a condenser connected to the outlet in the upper portion of the flash tank for condensing vapors evolved in the flash tank and a conduit for supplying condensate from said condenser to the cooling water in said condenser, and including a throttling valve in that portion of the closed circuit-forming conduit means leading from the direct condenser to the flash tank, said valve being adapted to be regulated to maintain a lower pressure in the flash tank than in the direct condenser.

References Cited in the file of this patent

UNITED STATES PATENTS

| | | |
|---|---|---|
| 1,235,552 | Chappell | Aug. 7, 1917 |
| 2,354,175 | Wilcoxson | July 18, 1944 |
| 2,556,064 | Caldwell et al. | June 5, 1951 |
| 2,770,295 | Allen | Nov. 13, 1956 |

FOREIGN PATENTS

| | | |
|---|---|---|
| 1,043,380 | France | Nov. 9 1953 |